United States Patent [19]

Tremblay

[11] Patent Number: 4,657,111

[45] Date of Patent: Apr. 14, 1987

[54] SCAFFOLD FOR SERVICING VESSEL PROPELLERS AND THE LIKE

[75] Inventor: Donald Tremblay, Contrecoeur, Canada

[73] Assignee: Marine Industrie Limitee, Canada

[21] Appl. No.: 821,685

[22] Filed: Jan. 23, 1986

[30] Foreign Application Priority Data

Nov. 22, 1985 [CA] Canada .................................. 496023

[51] Int. Cl.[4] ........................... E04G 1/22; B60P 1/16

[52] U.S. Cl. ..................................... 182/36; 182/62.5; 182/63; 182/141; 414/661; 414/663

[58] Field of Search ................ 182/62.5, 63, 141, 129, 182/36, 148; 414/618, 661, 663, 280

[56] References Cited

U.S. PATENT DOCUMENTS

| | | | |
|---|---|---|---|
| 2,395,411 | 2/1946 | Kittel | 414/663 |
| 2,867,334 | 1/1959 | Aiken | 414/661 |
| 3,446,366 | 5/1969 | Miller | 414/663 |
| 3,666,127 | 5/1972 | Guyaux | 182/62.5 |
| 4,064,968 | 12/1977 | Cook | 182/36 |
| 4,102,463 | 7/1978 | Schmidt | 414/663 |

FOREIGN PATENT DOCUMENTS

| | | | |
|---|---|---|---|
| 1170134 | 5/1962 | Fed. Rep. of Germany | 182/62.5 |

*Primary Examiner*—Reinaldo P. Machado

*Attorney, Agent, or Firm*—Steele, Gould & Fried

[57] ABSTRACT

The present invention relates to a scaffold for working under the stern of vessels for servicing propellers, propeller shafts, stern tubes, rudders and the like. The scaffold comprises a movable carriage to which is mounted a vertical support including actuating elements for raising or lowering a longitudinal platform at the upper part of the support. A further actuating element is used for longitudinally displacing the platform so as to reach the vessel parts to be serviced.

9 Claims, 8 Drawing Figures

10
12
14
16
18
20
22
24
26
28
30
34
36
38
40
42
44
46
48
50
64
66
68
70

Fig. 6
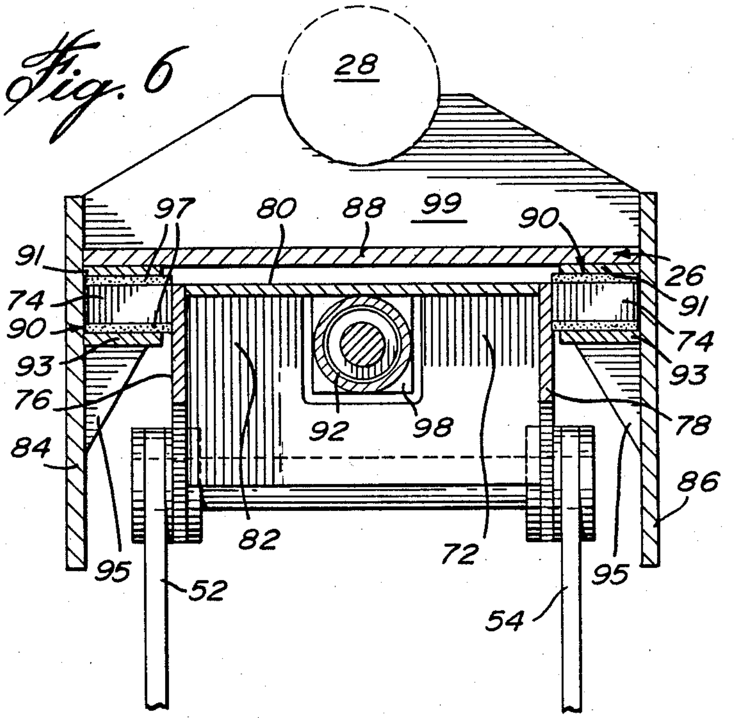
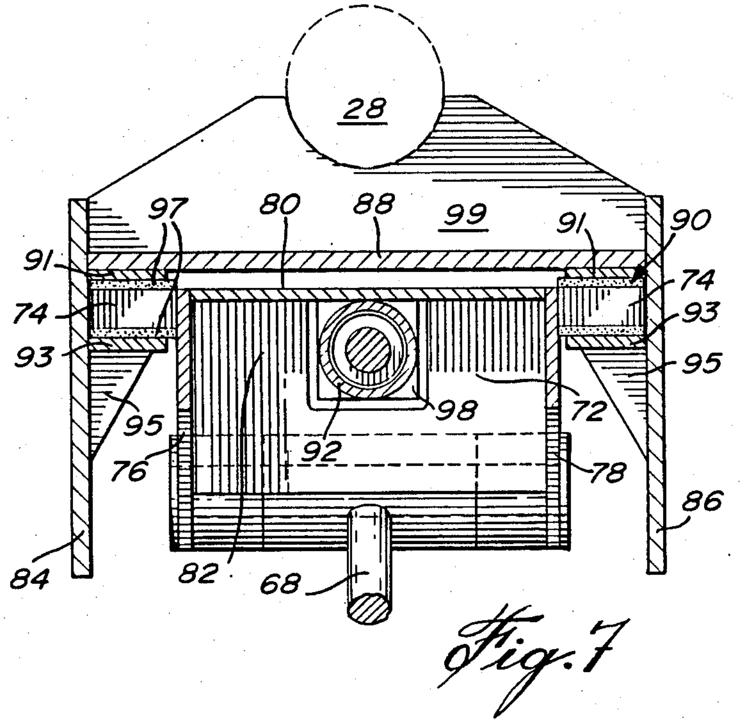
Fig. 7

SCAFFOLD FOR SERVICING VESSEL PROPELLERS AND THE LIKE

FIELD OF THE INVENTION

The present invention relates to a scaffold for working under the stern of vessels for servicing propellers, propeller shafts, stern tubes, rudders and the like.

BACKGROUND OF THE INVENTION

To service a vessel at present, tackles are welded to the underbody of the vessel, pulleys and cables are hooked to these tackles and scaffolds are erected for removing or mounting propellers, propeller shafts and rudders or for servicing parts of the vessel such as stern tubes and the like. All these operations require many activities, the operators of which belong to various trades. For example, up to twelve different trades are involved in the dismounting and mounting of a propeller shaft. An adequate coordination of these activities is often difficult resulting in great loss of time and important manpower cost.

OBJECTS AND STATEMENT OF THE INVENTION

One object of the present invention is to reduce the number of trades involved in vessel servicing thereby decreasing risks of accidents to the servicing personnal as well as reducing costs.

Another object of this invention is to simplify the steps involved in repairing and/or replacing the above-mentioned parts to be service.

These objects are achieved by providing a movable scaffold which comprises an articualted supporting structure carrying a longitudinally movable platform. The supporting structure is provided with an actuating mechanism, for lifting and tilting the platform at the desired level and angle. A second actuating mechanism is mounted between the platform and the supporting structure for longitudinally displacing the platform.

The present invention therefore relates, in its most general aspect, to a scaffold for use in the field of ship servicing. The scaffold comprises: a movable carriage; a vertical support means mounted to the carriage and a longitudinal platform means which is mounted at the upper end of the vertical support means and is adapted for a longitudinal displacement relative to the support means. The scaffold includes: first actuating means for raising the platform means to the propeller, propeller shaft, stern tube, rudder or the like and for tilting the platform means to enable a displacement of the platform means along a trajectory coinciding with the longitudinal axis of the propeller shaft or stern tube; and second actuating means connected between the platform means and the support means for longitudinally displacing the platform means relative to the support means.

In one variant of the invention the stern facing end of the platform means is provided with projecting fingers defining a fork to permit engagement of rudders or propellers for mounting and dismounting same.

Certain shipyards are equipped with rails for the lateral hauling of vessels. The procedure consists in mounting the ship on bogies which are constituted of frames mounted on rollers riding on the rails. The rail and bogie system acts as a linear roller bearing and only requires a relatively small force to laterally displace the vessel. When the scaffold according to this invention is to be used in such shipyards, it may advantageously be mounted for displacement on a pair of these rails passing under the stern area of the ship.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THR DRAWINGS

The following detailed description of preferred embodiments of this invention will be given with reference to the annexed drawings in which:

FIG. 6 is a sectional view taken along lines 6—6 of FIG. 4;

FIG. 7 is a sectional view taken along lines 7—7 of FIG. 4; and

DESCRIPTION OF PREFERRED EMBODIMENTS

Figure 1:
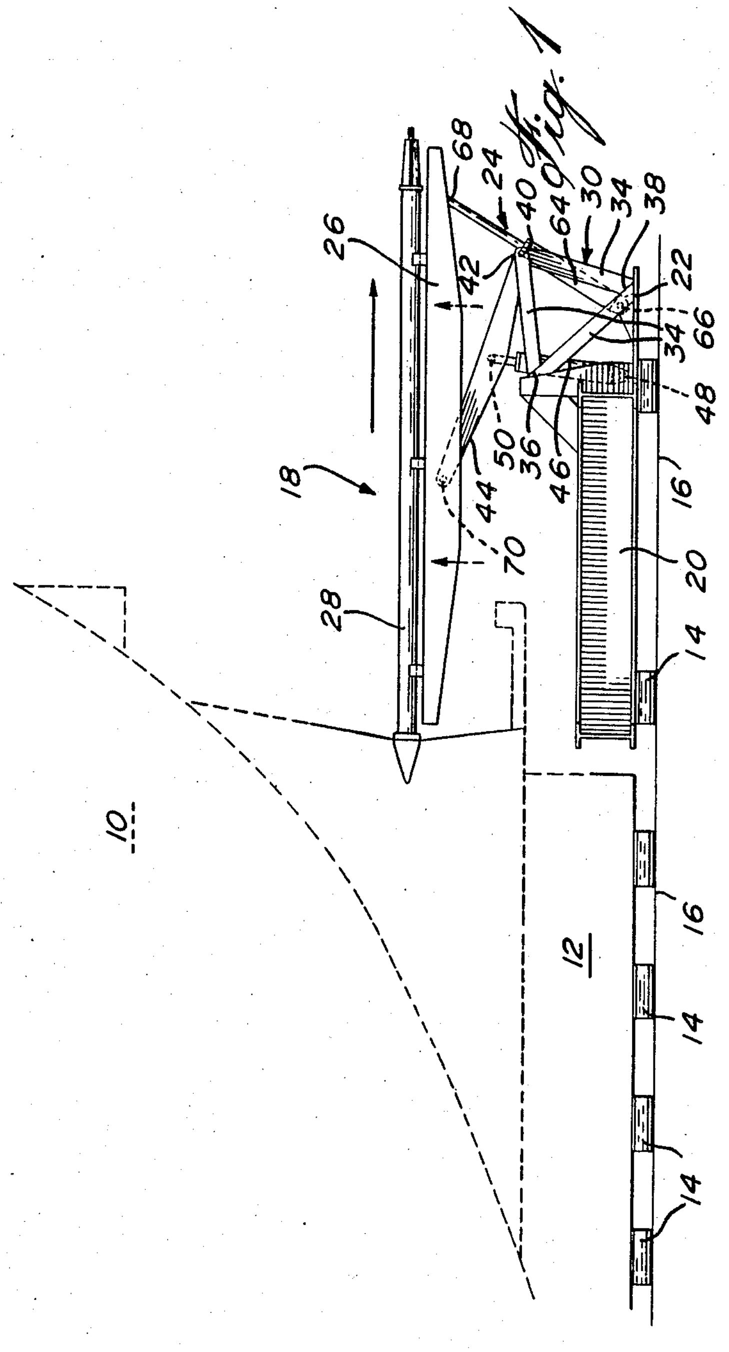
FIG. 1 is a side elevational view of the scaffold according to the present invention, installed in a shipyard provided with rails for the lateral hauling of vessels.

With reference to FIG. 1, the stern of a ship 10 to be serviced is illustrated in phantom lines. In certain shipyards provided with rails for the lateral hauling of vessels, it is a common procedure, prior to beginning any servicing, to mount the entire ship on bogies 12 (only one being shown) supported by steel rollers 14 that ride on rails 16 firmly secured to the ground. With this system, the vessel may be laterally hauled at the desired location in the shipyard by applying a relatively small displacement force.

A scaffold 18, according to the present invention is shown adjacent the stern of ship 10 and supporting the propeller shaft 28 thereof. Scaffold 18 is mounted on a carriage 20 constructed advantageously from metallic I-beams. Carriage 20 rides on steel rollers 14 mounted on a pair of rails 16, passing transversely under the stern of ship 10 and identical to the ones used to haul the vessel.

The scaffold of this invention may also be used in shipyards which are not equipped with rails for the lateral hauling of vessels. In such case, the carriage may be provided with wheels for the displacement of the scaffold.

A base plate 22 is attached at one end of carriage 20, opposite ship 10. Base plate 22 carries an articulated vertical supporting structure 24 to which is mounted a platform 26 receiving the propeller shaft 28 of vessel 10. Supporting structure 24 is used for raising and tilting platform 26 at the desired level and the desired angle, respectively. More specifically, vertical supporting structure 24 comprises a pair of parallel triangular trusses 30, each truss being constituted by elongated metallic members 34 joined at their ends by welding, for example. Each truss has two extremities 36 and 38, welded to carriage 20 and base plate 22, respectively, and a rearwardly projecting free end 40. Between free ends 40 of both trusses 30, is pivotally mounted the lower end 42 of a lever 44. Lever 44 is actuated by a hydraulic piston-cylinder assembly 46 having a bottom end 48 pivotally mounted to base plate 22 and an upper end 50 pivotally mounted to lever 44.

Figure 2:
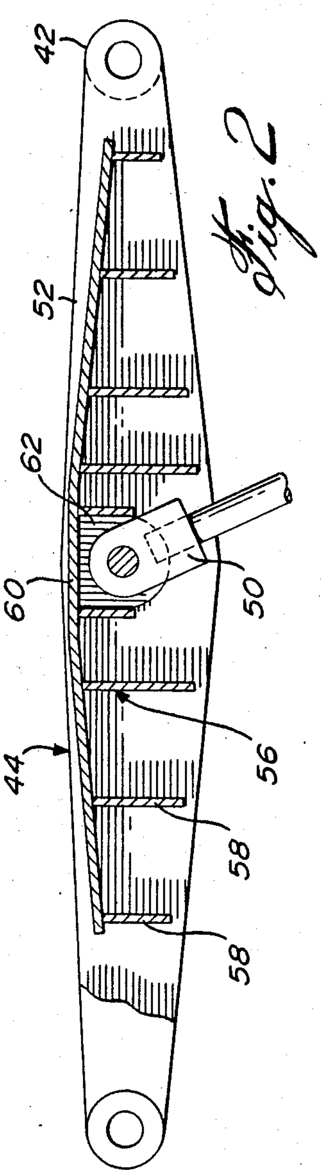
FIG. 2 is an enlarged vertical sectional view of a lever of the scaffold illustrated in FIG. 1.
Figure 3:
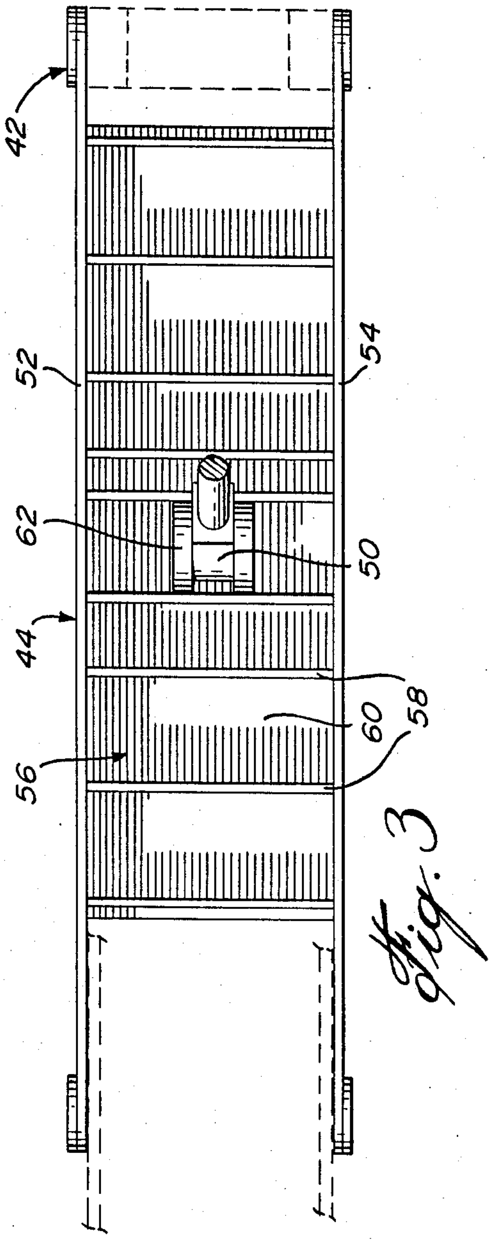
FIG. 3 is a bottom view of the element shown in FIG. 2.

Referring to FIGS. 2 and 3, lever 44 is constituted by two substantially flat members 52 and 54, interconnected in a face to face relationship by a rigidifying structure 56 constituted by a plurality of transverse plates 58 having opposite lateral edges welded to members 52 and 54. The upper edges of plates 58 are joined by a panel 60 to which is attached a yoke member 62 receiving the upper end 50 of piston-cylinder assembly 46.

Vertical supporting structure 24 (FIG. 1) further comprises a second piston-cylinder assembly 64 having a bottom end 66 which is pivotally mounted to base plate 22.

Figure 4:
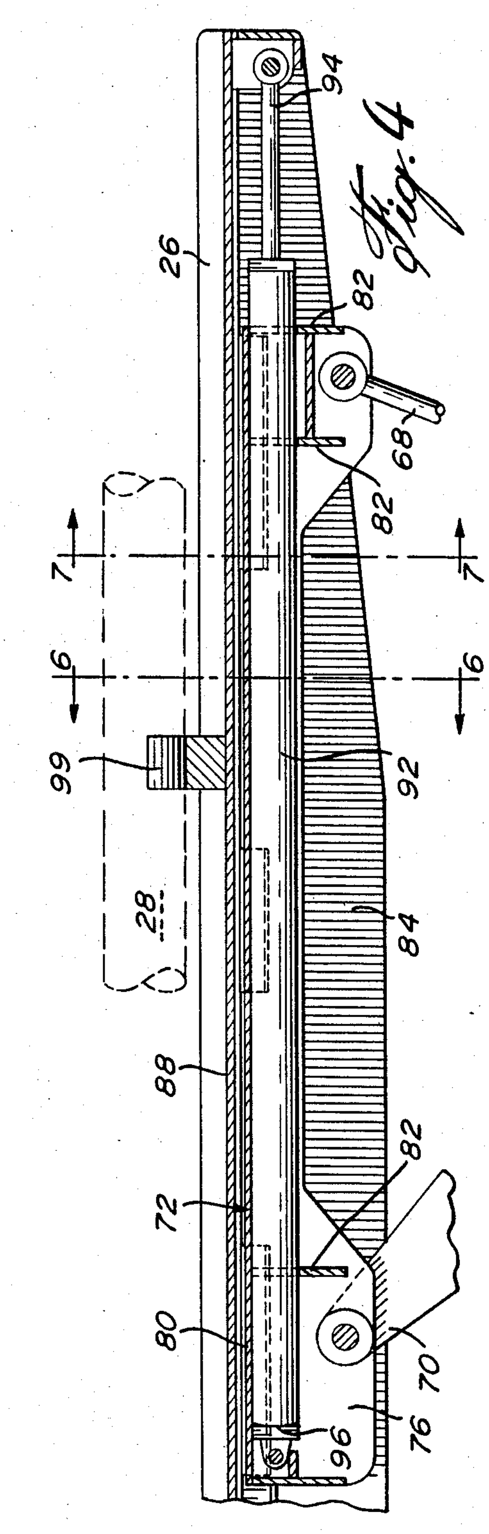
FIG. 4 is an enlarged vertical sectional view of the platform of the scaffold shown in FIG. 1.
Figure 5:
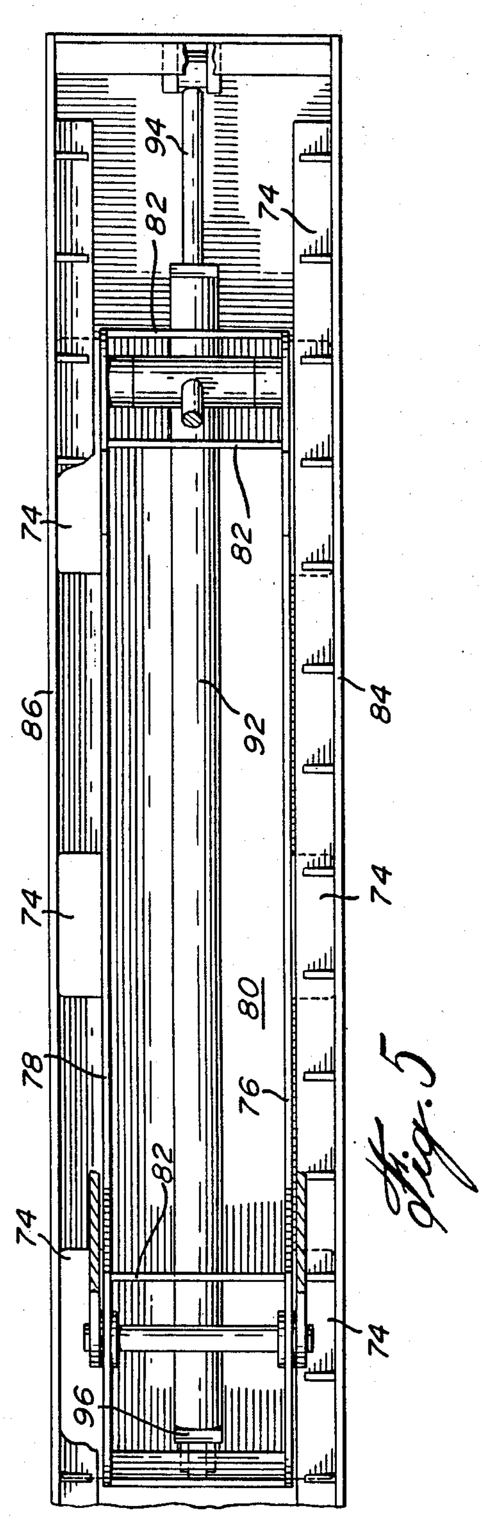
FIG. 5 is a bottom view of the platform shown in FIG. 4.

Referring to FIGS. 4 and 5, upper ends 68 and 70 of piston-cylinder assembly 64 and lever 44, respectively, are pivotally mounted to a platform carrying member 72 to which is slidingly mounted platform 26. Platform carrying member 72 comprises six laterally projecting guide blocks 74 arranged by groups of three on each side of platform carrying member 72.

As shown in FIGS. 6 and 7, platform carrying member 72 has a substantially U-shaped cross-section and is constituted by two lateral elongated plates 76 and 78 interconnected by an upper plate 80, plates 76, 78 and 80 are interconnected at certain intervals by rigidifying plates 82.

Platform 26 is also substantially U-shaped in cross-section and comprises two side plates 84 and 86 joined by a top plate 88. On the inner faces of side plates 84 and 86 are formed a pair of U-shaped tracks 90 slidingly receiving guide blocks 74. Tracks 90 extend the full lenght of platform 26 allowing the latter to slide on platform carrying member 72. Each track 90 is constituted by two narrow elongated plates 91 and 93. Plates 91 are welded to top plate 88, adjacent side plates 84 and 86, whereas plates 93 are secured on ribs 95 attached to the inner faces of side plates 84 and 86, respectively.

The surfaces of blocks 74 which are in contact with plates 91 and 93 are provided with a Teflon (trademark) coating 97 for reducing the friction when platform 26 slides on platform carrying member 72.

A third hydraulic piston-cylinder assembly 92 has one end 94 (see FIG. 4) connected to one end of platfrom 26 and an opposite end 96 attached to an extremity of platform carrying member 72. The major portion of piston-cylinder assembly 92 is mounted within platform carrying member 72 and extends through openings 98 made in rigidifying plates 82. By actuating piston-cylinder assembly 92, platform 26 may be displaced longitudinally relatively to platform carrying member 72.

With reference to FIGS. 4, 6 and 7, top plate 88 of platform 26 is provided with a plurality of longitudinally spaced support blocks 99 each having a U-shaped depression for receiving propeller shaft 28. Blocks 99 are slidingly moveable on the top surface of platform 26 for adequately supporting shaft 28 on platform 26.

Figure 8:
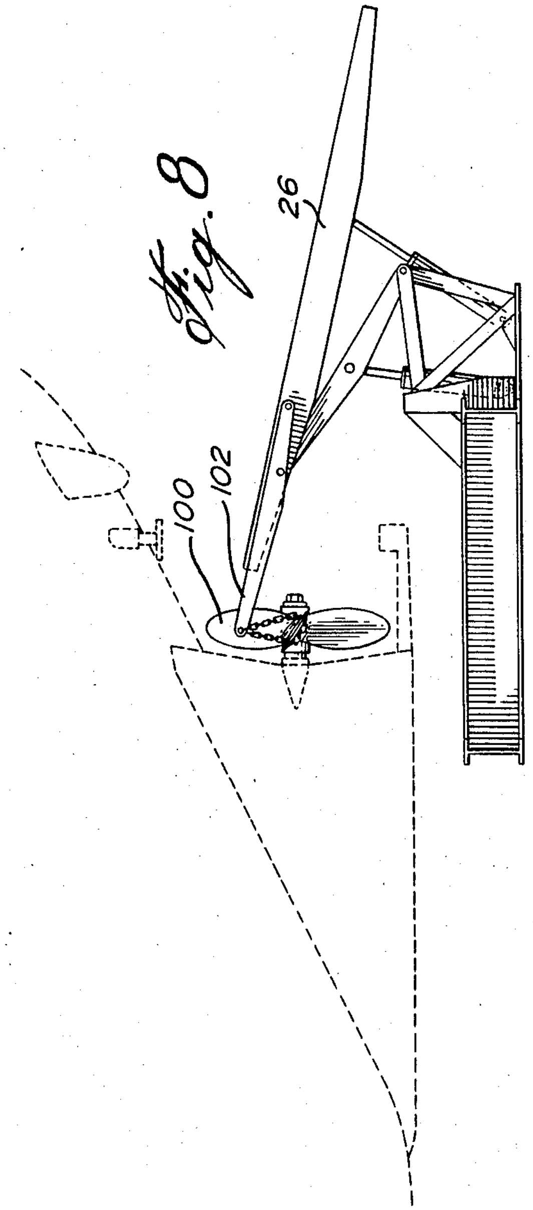
FIG. 8 is a side elevational view of a variant of the present invention.

Referring to FIG. 8, to remove the propeller 100 of ship 10, the front end of platform 26 is equipped with a pair of steel fingers 102 defining a fork which either engages the propeller or through the use of chains 101. The same system may be employed to remove a rudder, in which case a pin traverses the rudder to be supported on fingers 102.

The scaffold of this invention operates as follows.

Once a ship is positioned at the desired location in the shipyard, scaffold 18 is moved on tracks 16 until it is substantially aligned with ship 10. Hydraulic piston-cylinder assemblies 46 and 64 are operated for raising and tilting platform 26 along a trajectory coinciding with the axis of the propeller shaft. The tilting of platform 26 relatively to a horizontal line is achieved by extending or retracting one of the piston-cylinder assemblies 46 and 64. Subsequently, platform 26 may be moved, relatively to the ship 10, by actuating piston-cylinder assembly 92 for performing the various servicing acts on the ship.

For example, for inserting the propeller shaft 28 into the stern tube, the shaft 28 is first firmly secured to the platform 26 by means of chains, for example, in order to prevent support blocks 99 from moving on the top surface of platform 26. When piston-cylinder assembly 92 is actuated. The extremity of shaft 28 is inserted at the stern tube enhance. The chains are then removed and the platform 26 is shifted rearwardly allowing blocks 99 to slide on the top surface of platform 26. The chains are installed again and the platform 26 is actuated to insert another lenght of shaft 28 in the stern tube. The procedure is repeated until the shaft 28 is fully inserted in the stern tube. The extraction of propeller shaft 28 from the stern tube is the reverse of the insertion procedure.

The above description of preferred embodiment of the present invention has been given only as an example and should not considered as limiting in any sense. The scope of the invention is defined in the annexed claims.

The embodiments of the invention in which an exclusive property or privilege is claimed are defined as follows:

1. For use in a shipyard, a scaffold for working under the stern of vessels to service propellers, propeller shafts, stern tubes, rudders and the like, said scaffold comprising:

- a movable carriage;
- vertical support means mounted to said carriage;
- longitudinal platform means mounted at the upper end of said vertical support means and adapted for longitudinal displacement relative to said support means;
- first actuating means for raising said platform means to said propeller, propeller shaft, stern tubes, rudders or the like, and for tilting said platform means along a trajectory coinciding with the longitudinal axis of said propeller shaft or stern tube; and
- second actuating means connected between said platform means and said support means for longitudinally displacing said platform means relative to said support means.

2. A scaffold as defined in claim 1, further comprising carrying means on said platform means for receiving a propeller shaft for insertion to or retraction from the stern tube of a vessel.

3. A scaffold as defined in claim 2, wherein said carrying means are slidably mounted on said platform means.

4. A scaffold as defined in claim 1, wherein the shipyard being provided with rails for the lateral hauling of vessels, wherein said carriage includes a plurality of roller means located on at least a pair of rails passing transversely under the stern of a ship to be serviced in said shipyard.

5. A scaffold as defined in claim 1, wherein said vertical support means consists of an articulated structure mounted at one end of said carriage opposite said stern, said vertical support means including, at the upper end thereof, a platform-carrying member to which is slidingly mounted said platform.

6. A scaffold as defined in claim 5, wherein said articulated structure comprises:

a lower section fixedly attached to said carriage; and a leverage section having one end pivotably connected to said lower section and the other end pivotably connected to said platform carrying member;

said first actuating means including an hydraulic cylinder having one end mounted to said lower section and the other end connected to said leverage section.

7. A scaffold as defined in claim 5, wherein said first actuating means further includes a second hydraulic cylinder having one end connected to said lower section and the other end connected to said platform carrying member.

8. A scaffold as defined in claim 2 or 3, wherein said carrying means for receiving a propeller shaft consist of a plurality of U-shaped support blocks longitudinally spaced on the top surface of said platform means.

9. A scaffold as defined in claim 1, 2 or 3, further comprising means mounted at the stern facing end of said platform means for engaging means on said propellers or rudders for raising a lowering said propellers or rudders.

* * * * *